(12) United States Patent
Tamayama (10) Patent No.: US 6,892,242 B1
(45) Date of Patent: May 10, 2005

(54) INFORMATION PROCESSING APPARATUS AND METHOD, AND RECORDING MEDIUM USED THEREWITH

(75) Inventor: Ken Tamayama, Tokyo (JP)

(73) Assignee: Sony Corporation, Tokyo (JP)

( * ) Notice: Subject to any disclaimer, the term of this patent is extended or adjusted under 35 U.S.C. 154(b) by 689 days.

(21) Appl. No.: 09/664,858

(22) Filed: Sep. 19, 2000

(30) Foreign Application Priority Data

Sep. 21, 1999 (JP) .......................................... P11-267261

(51) Int. Cl.$^7$ ............................................. G06F 15/16
(52) U.S. Cl. ..................................... 709/231; 709/232
(58) Field of Search ................................ 709/231, 232; 379/207.13, 110.01; 705/27; 382/224

(56) References Cited

U.S. PATENT DOCUMENTS

| | | | | |
|---|---|---|---|---|
| 5,367,522 A | * | 11/1994 | Otani | 370/468 |
| 5,675,789 A | * | 10/1997 | Ishii et al. | 707/204 |
| 5,848,137 A | * | 12/1998 | Hsiao | 379/110.01 |
| 6,185,228 B1 | * | 2/2001 | Takashimizu et al. | 370/535 |
| 6,256,071 B1 | * | 7/2001 | Hiroi | 348/553 |
| 6,373,527 B1 | * | 4/2002 | Lee | 348/564 |
| 6,411,735 B1 | * | 6/2002 | Williams et al. | 382/224 |
| 6,434,171 B1 | * | 8/2002 | Ishida | 370/537 |
| 6,445,783 B1 | * | 9/2002 | Creswell et al. | 379/207.13 |
| 6,453,302 B1 | * | 9/2002 | Johnson et al. | 705/27 |
| 6,493,461 B1 | * | 12/2002 | Mennie et al. | 382/135 |
| 6,549,658 B1 | * | 4/2003 | Schweid et al. | 382/173 |
| 6,621,588 B1 | * | 9/2003 | Shimada | 358/1.15 |

FOREIGN PATENT DOCUMENTS

| | | |
|---|---|---|
| EP | 0 794 663 | 9/1997 |
| EP | 0 843 482 | 5/1998 |
| WO | WO 99 34594 | 7/1999 |

* cited by examiner

Primary Examiner—Nabil El-Hady
(74) Attorney, Agent, or Firm—Frommer Lawrence & Haug LLP; William S. Frommer; Samuel S. Lee (57) ABSTRACT

An information processing apparatus includes a channel selection task. The channel selection task controls an application program interface (API) to load a detecting microcode into a transport stream processor. The transport stream processor detects a transport stream based on the microcode, and outputs a signal representing detection of the transport stream to an interruption handler. The interruption handler outputs a semaphore signal to the channel selection task. The channel selection task controls the API to output an audiovisual microcode to the transport stream processor. The transport stream processor acquires program-specification information based on the microcode. The transport stream processor performs direct memory access transfer of the information to a memory 28, and outputs an interruption signal representing completion of the transfer to a software driver. The interruption handler outputs a semaphore signal representing completion of the transfer to the channel selection task. The channel selection task analyzes the information from the memory 28, and controls the transport stream processor to output a list of programs.

18 Claims, 7 Drawing Sheets

INFORMATION PROCESSING APPARATUS AND METHOD, AND RECORDING MEDIUM USED THEREWITH

BACKGROUND OF THE INVENTION

1. Field of the Invention

The present invention relates to information processing apparatuses and methods, and recording media for use therewith, and in particular, to an information processing apparatus and method which receives information processed by one of a plurality of methods and which performs high speed processing adapted for the received information, and a recording medium for use with the information processing apparatus and method.

2. Description of the Related Art

A technology has come into wide use which extracts the desired information by separating a required signal from a multiplexed signal in which pictures, sounds, data, etc., in a digital broadcast, are combined. A typical example of this technology is applied to a set-top box for receiving digital broadcasts. In this technology, a digital-broadcast multiplexed signal called a "transport stream" is received, and the packets of the transport stream are divided corresponding to their output destinations by identifying the specifications of data recorded in the header of each packet, whereby the multiplexed signal is separated.

Techniques that separate the multiplexed signal include software processing using a high speed microcomputer, hardware processing using a dedicated logic circuit, and processing by controlling a logic circuit with a program called a "microcode" determining the operation of the logic circuit.

In addition, terrestrial-wave television broadcasting in accordance with the Moving Picture Experts Group 2 standard (MPEG-2) is discussed in, for example, the U.S.A. Conversely, in order for a set-top box, which is for use in already practiced satellite-used television broadcasting by methods different from the MPEG-2, to receive television broadcasts in accordance with the methods, a function of receiving broadcast signals in accordance with the methods must be provided to the set-top box.

In enabling high-speed processing of separating multiplexed signals obtained by a plurality of multiplexing methods, a problem occurs in that the number of adaptable multiplexing methods must be limited, or processing software and hardware must be enlarged when the number of adaptable multiplexing methods is not limited.

SUMMARY OF THE INVENTION

Accordingly, in view of the foregoing circumstances, it is an object of the present invention to provide an information processing apparatus and method adapted for a plurality of multiplexing methods that separates a multiplexed signal at high speed, and a recording medium for use with the information processing apparatus and method.

To this end, according to an aspect of the present invention, the foregoing object is achieved through provision of an information processing apparatus including a receiving unit for receiving one of a plurality of types of information processed by a plurality of different methods, a determination unit for determining one of the methods for the type of information received by the receiving unit, a storage unit for storing a plurality of programs corresponding to the methods, and a processing circuit for processing the type of information received by the receiving unit by reading a program corresponding to the determined method, which is one of the stored programs.

Preferably, the storage unit includes a changer unit for changing the plurality of programs.

The types of information may be transport streams.

The circuit unit may perform a process for converting the format of a transport stream as the type of information received by the receiving unit into a different transport stream format.

The types of information may be multiplexed signals composed of images, sounds, and data.

The processing circuit may perform a process for separating a multiplexed signal as the type of information received by the receiving unit.

The types of information processed by the different methods may be a satellite broadcast signal, a terrestrial broadcast signal, a community antenna television signal, and a signal input from an external unit.

According to another aspect of the present invention, the foregoing object is achieved through provision of an information processing method including the steps of: receiving one of a plurality of types of information processed by a plurality of different methods; determining one of the methods for the type of information received in the receiving step; storing a plurality of programs corresponding to the methods; and processing the type of information received in the receiving step by reading a program corresponding to the method determined in the determination step, the read program being one of the programs stored in the storage step.

According to a further aspect of the present invention, the foregoing object is achieved through provision of a computer-readable recording medium containing a program for controlling an apparatus to execute the steps of: receiving one of a plurality of types of information processed by a plurality of different methods; determining one of the methods for the type of information received in the receiving step; storing a plurality of programs corresponding to the methods; and processing the type of information received in the receiving step by reading a program corresponding to the method determined in the determination step, the read program being one of the programs stored in the storage step.

According to the present invention, received information is processed by determining one of methods by which the received information is processed, and reading a program corresponding to the determined method, which is one of stored programs. Therefore, the number of processible multiplexing methods can be increased and information can be processed at high speed.

DESCRIPTION OF THE PREFERRED EMBODIMENTS

Figure 1:
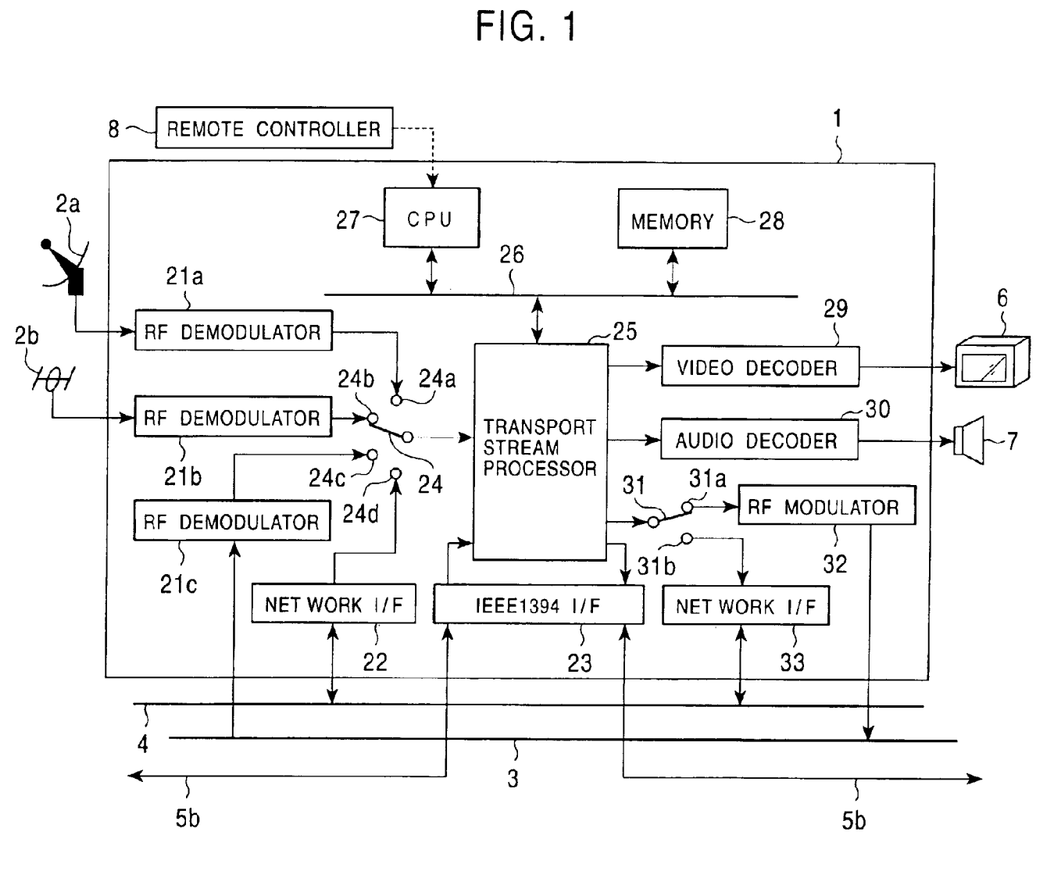
FIG. 1 is a block diagram showing a set-top box to which the present invention is applied.

FIG. 1 shows an example of a set-top box 1 to which the present invention is applied. To the set-top box 1, an antenna 2a for receiving satellite broadcast signals, an antenna 2b for receiving terrestrial broadcast signals, a community antenna television (CATV) cable 3 for receiving CATV broadcast signals, a local area network (LAN) cable 4 for transmitting and receiving LAN broadcast signals, IEEE (Institute of Electrical and Electronic Engineers) 1394 cables 5a and 5b for transmitting/receiving data to/from external units (not shown), a video monitor 6, and a speaker 7 are connected.

The antenna 2a is connected to a radio-frequency (RF) demodulator 21a in the set-top box 1. The antenna 2a receives the satellite broadcast signals from a satellite (not shown), and outputs the received signals to the RF demodulator 21a. The antenna 2b is connected to an RF demodulator 21b in the set-top box 1. The antenna 2b receives the terrestrial broadcast signals from a ground broadcasting station (not shown), and outputs the received signals to the RF demodulator 21b.

The CATV cable 3 is connected to an RF demodulator 21c and an RF demodulator 32. The CATV cable 3 outputs the CATV broadcast signals to the RF demodulator 21c, and transmits CATV broadcast signals output from the RF demodulator 32.

The LAN cable 4 is connected to network interfaces (I/Fs) 22 and 33. The LAN cable 4 outputs the LAN broadcast signals to the network I/F 22, and transmits LAN broadcast signals output from the network I/F 33.

The IEEE 1394 cables 5a and 5b have ends connected to an IEEE 1394 I/F 23, and can transmit/receive pictures, sounds, and data to/from external units (not shown) connected to the other ends of the IEEE 1394 cables 5a and 5b.

The video monitor 6 displays pictures based on video signals input from a video decoder 29. The speaker 7 outputs audio signals input from an audio decoder 30.

A remote controller 8 that has a plurality of buttons outputs infrared signals corresponding to operations by a user and outputs a central processing unit (CPU) 27 via an infrared interface.

The RF demodulators 21a and 21b demodulate RF signals from the antennas 2a and 2b, respectively, and the RF demodulator 21c demodulates an RF signal from the CATV cable 3. The RF demodulators 21a to 21c output the demodulated signals to the terminals 24a to 24c of a switch 24, respectively.

The network I/F 22 outputs the input LAN broadcast signal to the terminal 24d of the switch 24.

The switch 24 is controlled by the CPU 27 to switch to one of the terminals 24a to 24d, whereby the signal input from the terminal 24a, 24b, 24c, or 24d is output to the transport stream processor 25.

The IEEE 1394 I/F 23 functions as an interface between an external unit (not shown) connected to the IEEE 1394 cables 5a and 5b and the transport stream processor 25.

The transport stream processor 25 processes, based on a program called a "microcode" which is sent from the CPU 27 via a CPU bus 26, a transport stream input from the IEEE 1394 I/F 23 or the switch 24. The transport stream processor 25 outputs the processed stream either to the video decoder 29 or the audio decoder 30 at a subsequent stage, or to the RF modulator 32, the network I/F 33, or the IEEE 1394 I/F 23 via the switch 31. The transport stream processor 25 is described later with reference to FIG. 2.

The CPU 27 controls the operations of the entirety of the set-top box 1, and uses the memory 28, as required, to transfer microcodes and setting information to the transport stream processor 25 via the CPU bus 26 so that the transport stream processor 25 processes the transport stream and outputs required program information. The CPU 27 analyzes the processed information from the transport stream processor 25, and outputs the analyzed information as program information to the video monitor 6 via the transport stream processor 25 and the video decoder 29.

The video decoder 29 processes the signal input from the transport stream processor 25 or the CPU 27, and outputs the processed signal as video signal to the video monitor 6.

The audio decoder 30 decodes the signal input from the transport stream processor 25, and outputs the decoded signal as audio signal to the speaker 7.

The switch 31 is controlled by the CPU 27 to switch to either terminal 31a or 31b. Accordingly, the signal from the transport stream processor 25 is output to the RF modulator 32 via the terminal 31a or to the network I/F 33 via the terminal 31b.

The RF modulator 32 generates an RF signal by modulating the signal from the transport stream processor 25, which is input via the switch 31, and outputs the RF signal to the CATV cable 3.

The network I/F 33 performs interface processing on the signal from the transport stream processor 25, which is input via the switch 31, and outputs the processed signal to the LAN cable 4.

Figure 2:
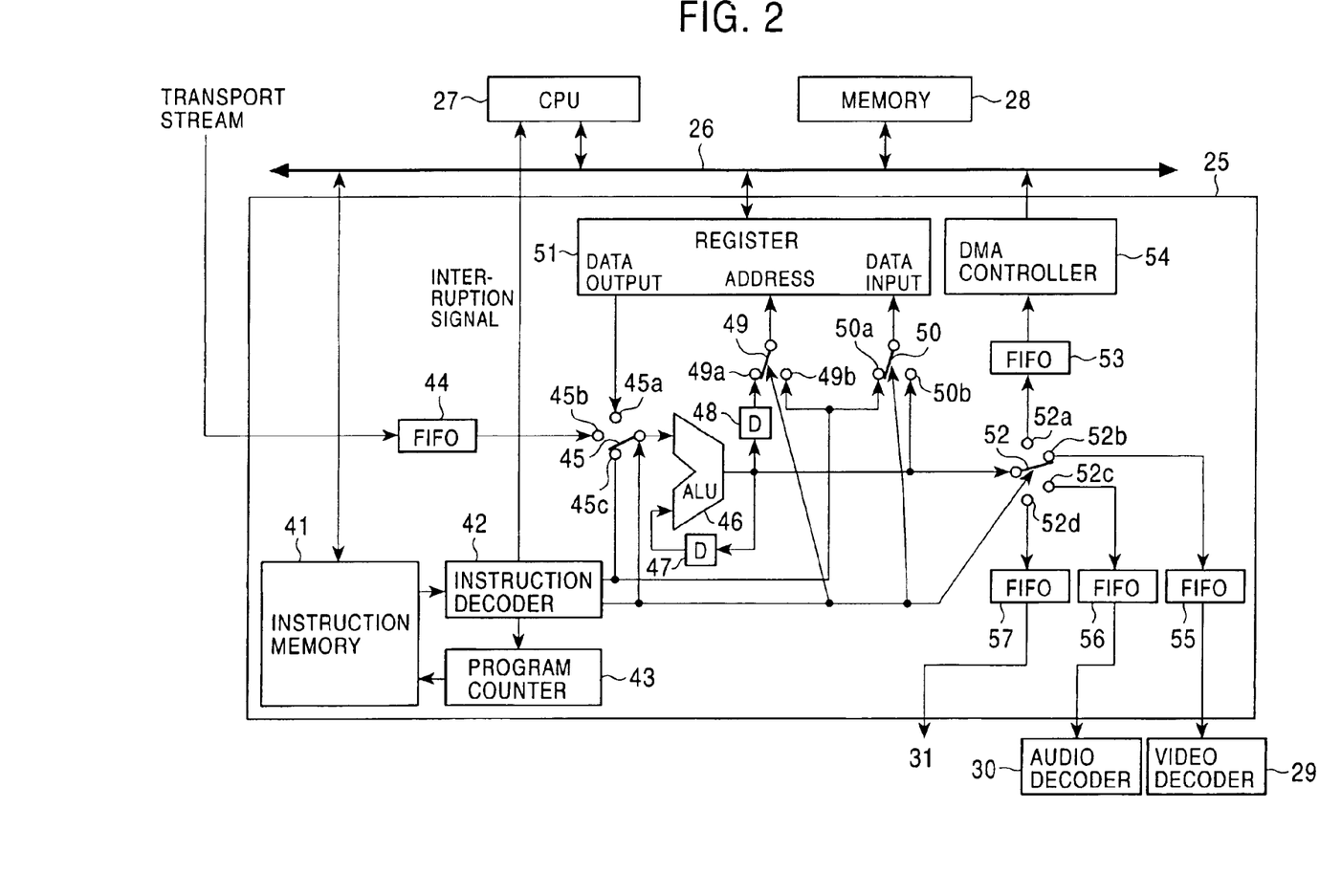
FIG. 2 is a block diagram showing the transport stream processor 25 shown in FIG. 1.

With reference to FIG. 2, the detailed structure of the transport stream processor 25 is described below.

An instruction memory 41 in the transport stream processor 25 stores programs (called "microcodes" from the CPU 27) that control the operations of the transport stream processor 25. The microcodes differ depending on processing types such as processes relating to the types of transport streams and detection of a transport stream. A microcode corresponding to each processing type is sent from the CPU 27.

An instruction decoder 42 reads the microcode stored in the instruction memory 41, and executes the corresponding process. When executing the process, the instruction decoder 42 outputs an interruption signal to the CPU 27, as required, and controls each of switches 45, 49, 50, and 52 to select a predetermined terminal. The instruction decoder 42 outputs data to terminals 45c, 49b, and 50a.

A program counter 43 executes an counting operation in accordance with the processing by the instruction decoder 42, controls the instruction memory 41 so that it selects a program having predetermined order and supplies the program to the instruction decoder 42.

A first-in first-out memory (hereinafter referred to as a "FIFO") 44 temporarily stores and outputs the transport stream input from the switch 24 to the terminal 44b of the switch 45.

The switch 45 is controlled by the instruction decoder 42 to switch to each of terminals 45a to 45c. When the switch 45 is connected to the terminal 45a, the data from a register 51 is output to an arithmetical and logical unit (ALU) 46. When the switch 45 is connected to the terminal 45b, data from the FIFO 44 is output to the ALU 46. When the switch 45 is connected to the terminal 45c, data from the instruction decoder 42 is output to the ALU 46.

Based on a command from the instruction decoder 42, the ALU 46 performs an operation, such as addition, subtraction, multiplication, division, comparison, transfer, or replacement, the data input from the switch 45 and data output from the ALU 46 which is delayed one clock by a delay unit 47. The ALU 46 outputs the result of the operation to the delay unit 47, a delay unit 48, the terminal 50b, and the switch 52.

The delay units 47 and 48 temporarily store the data input from the ALU 46, and delay the data for one clock. The delayed data are output to the subsequent stage.

The switch 49 is controlled by the instruction decoder 42 to switch to either terminal 49a or 49b. When the switch 49 is connected to the terminal 49a, the data from the delay unit 48 is supplied to an address input terminal (indicated by "ADDRESS" in FIG. 2) of the register 51. When the switch 49 is connected to the terminal 49b, the data from the instruction decoder 42 is supplied to the address input.

The switch 50 is controlled by the instruction decoder 42 to switch to either terminal 50a or 50b. When the switch 50 is connected to the terminal 50a, the data from the instruction decoder 42 is supplied to a data input terminal of the register 51. When the switch 50 is connected to the terminal 50b, the data from the ALU 46 is supplied to the data input terminal of the register 51.

The register 51 stores the address data input from the switch 49 and the data input from the switch 50, or various setting data supplied from the CPU 27, and outputs the data to the ALU 46 via the switch 45 when it is connected to the terminal 45a.

The switch 52 is controlled by the instruction decoder 42 to switch to one of terminals 52a to 52d. Data input from the ALU 46 to the switch 52 is output to one of the terminals 52a to 52d.

When the switch 52 is connected to the terminal 52a, after being temporarily stored in the FIFO 53, the data supplied from the ALU 46 is output from the FIFO 53 to a direct memory access (DMA) controller 54.

The DMA controller 54 directly transfers (DMA transfer of) the data input from the FIFO 53 to the memory 28 not via the CPU 27.

When the switch 52 is connected to the terminal 52b, after being temporarily stored in the FIFO 55, the data supplied from the ALU 46 is output from the FIFO 55 to the video decoder 29.

When the switch 52 is connected to the terminal 52c, after being temporarily stored in the FIFO 56, the audio data from the ALU 46 is output to the audio decoder 30.

When the switch 52 is connected to the terminal 52d, after being temporarily stored in the FIFO 57, the signal from the ALU 46 is output to the RF modulator 32 or the network I/F 33.

In the IEEE 1394 I/F 23, data treated by the IEEE 1394 cables 5a and 5b are processed as described above.

The operation of the set-top box 1 when it receives a satellite broadcast signal and outputs a picture from the video monitor 6 and sound from the speaker 7 is described below with reference to FIG. 1.

The antenna 2a receives a satellite broadcast RF signal from a satellite (not shown), and outputs the RF signal to the RF modulator 21a. The RF modulator 21a demodulates the input RF signal, and outputs data (transport steam) obtained by the demodulation to the terminal 24a.

At this time, the switch 24 is controlled by the CPU 27 to be connected to the terminal 24a. This allows the transport stream to be input to the transport stream processor 25 via the switch 24.

The transport stream processor 25 processes the transport stream, based on the microcode sent from the CPU 27, and outputs program information included in the transport stream to the CPU 27.

The CPU 27 analyzes the input program information. In accordance with the result of the analysis, the CPU 27 controls the transport stream processor 25 to output video data to the video decoder 29. The video decoder 29 decodes the input video data, and outputs the decoded data as video signals to the video monitor 6. Based on the video signals, the video monitor 6 displays a picture of the program.

When the displayed picture is an electronic program guide, the user operates the remote controller 8 based on the electronic program guide, and selects a predetermined channel. The remote controller 8 outputs a signal (hereinafter referred to as a "channel selection signal") corresponding to the selected channel to the CPU 27.

Based on the channel selection signal, the CPU 27 outputs setting data to the transport stream processor 25. Based on the setting data, the transport stream processor 25 extracts video data and audio data on the user-selected channel, and outputs the extracted video data to the video decoder 29 and the extracted audio data to the audio decoder 30. The detailed operation of the transport stream processor 25 is described later.

The video decoder 29 decodes the input video data, and outputs the decoded video data as video signals to the video monitor 6. The audio decoder 30 decodes the input audio data, and outputs the decoded audio data as audio signals to the speaker 7. The video monitor 6 displays a picture based on the input video signals, and the speaker 7 outputs sound based on the input audio signals.

In the case where a terrestrial broadcast RF signal is received, the antenna 2b receives and outputs the terrestrial broadcast RF signal to the RF demodulator 21b. At this time, the switch 24 is controlled by the CPU 27 to be connected to the terminal 24b. The RF demodulator 21b demodulates the input RF signal, and outputs the demodulated signal to the transport stream processor 25 via the switch 24 which is connected to the terminal 24b. The subsequent processing is similar to that in the case where the satellite broadcast signal is received. Accordingly, a description of the processing is omitted.

In the case where the CATV broadcast signal is received, the RF signal transmitted through the CATV cable 3 is input to the RF demodulator 21c. At this time, the switch 24 is controlled by the CPU 27 to be connected to the terminal 24c. The RF demodulator 21c demodulates the input RF signal, and outputs the demodulated signal as a transport stream to the transport stream processor 25. The subsequent processing is similar to that in the where the satellite broadcast signal is received. Accordingly, a description of the processing is omitted.

In the case where the LAN broadcast is received, the signal transmitted through the LAN cable 4 is input to the network I/F 22, and is output as a transport stream to the transport stream processor 25 via the switch 24. The subsequent processing is similar to that in the where the satellite broadcast signal is received. Accordingly, a description of the processing is omitted.

In the case where a signal input from the external unit (not shown) connected to the IEEE 1394 cable 5a or 5b is received, the signal is input to the IEEE 1394 I/F 23 from the IEEE 1394 cable 5a or 5b. The subsequent processing is similar to that in the where the satellite broadcast signal is received. Accordingly, a description of the processing is omitted.

In the case where video and audio signals are output to the CATV cable 3 for cable television, the signal from the transport stream processor 25 is output to the switch 31. At this time, the switch 31 is controlled by the CPU 27 to be connected to the terminal 31a. The signal from the transport stream processor 25 is input to the RF modulator 32 via the switch 31. The RF modulator 32 modulates the input signal, and outputs an RF signal obtained by the modulation to the CATV cable 3.

When the RF modulator 32 outputs the RF signal to the LAN cable 4, the switch 31 is controlled by the CPU 27 to be connected to the terminal 31b. As a result, the signal from the transport stream processor 25 is output to the LAN cable 4.

In the case where the signal from the transport stream processor 25 is output to the external unit (not shown) via the cable 5a or 5b, the signal from the transport stream processor 25 is output to the IEEE 1394 I/F 23. After the IEEE 1394 I/F performs interface processing on the signal, the processed signal is output to the external unit (not shown) via the IEEE 1394 cable 5a or 5b.

Next, the operation of the transport stream processor 25 is described below.

The instruction memory 41 in the transport stream processor 25 stores the microcodes sent from the CPU 27. The instruction decoder 42 sequentially reads, from the microcodes stored in the instruction memory 41, microcodes designated by count values of the program counter 43, and executes processes corresponding to the read microcodes.

Based on the microcodes, the instruction decoder 42 controls switch 45, 49, 50, and 52 so that the switch 45 is connected to one of the terminals 45a to 45c, the switch 49 is connected to either terminal 49a or 49b, the switch 50 is connected to either terminal 50a or 50b, and the switch 52 is connected to one of the terminal 52a to 52d. Based on the microcodes, the instruction decoder 42 outputs data to the terminals 45c, 49b, and 50a. The instruction decoder 42 also outputs, to the CPU 27, an interruption signal that represents the generation of an error, detection of a transport stream, completion of DMA transfer, or the like. Based on the interruption signal, the CPU 27 loads various microcodes into the instruction memory 41, and outputs and stores various setting data in the register 51. Software in the CPU 27 is described later with reference to FIG. 3.

When the switch 45 is connected to the terminal 45a, the data stored in the register 51 is output to the ALU 46 via the switch 45.

When the switch 45 is connected to the terminal 45b, the transport stream temporarily stored in the FIFO 44 is output to the ALU 46 via the switch 45.

When the switch 45 is connected to the terminal 45c, the data output from the instruction decoder 42 is output to the ALU 46.

The ALU 46 processes the data input from the switch 45, and the result of operations by the ALU 46, which is delayed by the delay unit 47, by performing operations (addition, subtraction, multiplication, division, comparison, transfer, or replacement) based on a command signal from the instruction decoder 42, and outputs the result to the delay unit 47, the terminal 49a (via the delay unit 48), the terminal 50b, and the switch 52.

When the switch 49 is connected to the terminal 49a, the data from the ALU 46 which is delayed by the delay unit 48 is supplied to the register 51 via the switch 49.

When the switch 49 is connected to the terminal 49b, the data output from the instruction decoder 42 is supplied to the address input terminal of the register 51 via the switch 49.

When the switch 50 is connected to the terminal 50a, the data output from the instruction decoder 42 is supplied to the data input terminal of the register 51.

When the switch 50 is connected to the terminal 50b, the data from the ALU 46 is supplied to the data input terminal of the register 51 via the switch 50.

When the switch 52 is connected to the terminal 52a, the data from the ALU 46 is output to the DMA controller 54 via the FIFO 53. The DMA controller 54 directly transfers the input data to the memory 28 via the CPU bus 26 without using the CPU 27.

When the switch 52 is connected to the terminal 52b, the data from the ALU 46 is output to the video decoder 29 via the FIFO 55.

When the switch 52 is connected to the terminal 52c, the data from the ALU 46 is output to the audio decoder 30 via the FIFO 56.

When the switch 52 is connected to the terminal 52d, the data from the ALU 46 is output to the switch 31 via the FIFO 57.

Figure 3:
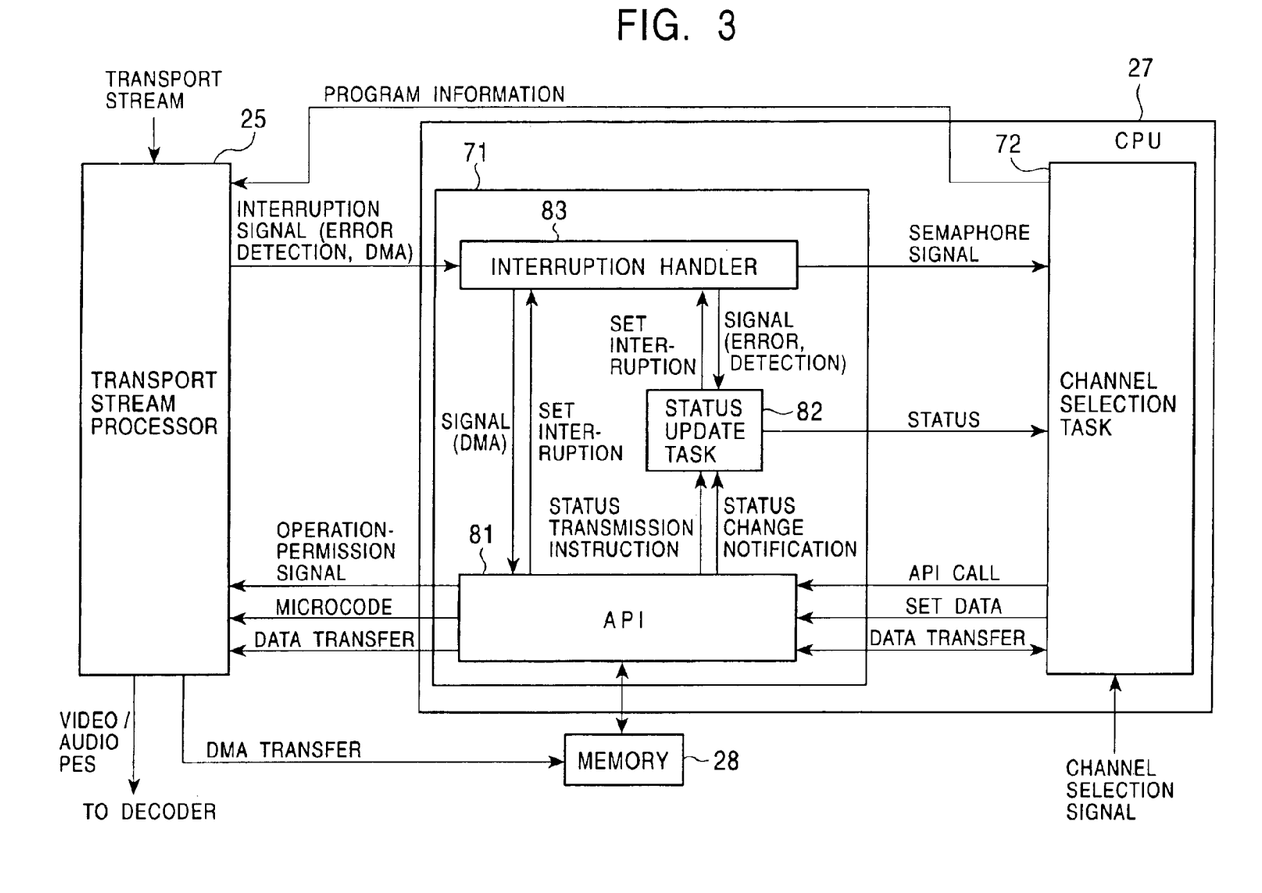
FIG. 3 is a block diagram showing software in the CPU 27 shown in FIG. 1.

With reference to FIG. 3, the software in the CPU 27 and the transport stream processor 25 are described below.

In FIG. 3, a software driver 71 includes an application program interface (API) 81, a status update task 82, and an interruption handler 83. The software driver 71 and a channel selection task 72 are software executed by the CPU 27. Although the CPU bus 26 is omitted, data are transmitted and received by the CPU bus 26 among the transport stream processor 25, the CPU 27, and the memory 28.

Based on an instruction of calling the API 81 from the channel selection task 72, the API 81 in the software driver 71 executes, with predetermined timing, a process for notifying the status update task 82 of status change, a command for controlling the channel selection task 72 to perform transmission, a process for setting an interruption to the interruption handler 83, a process for transferring a microcode detecting the type of a transport stream or an audio-visual microcode adapted for the detected type of transport stream to the transport stream processor 25, output of an operation-permission signal to the transport stream processor 25, and a process for transferring setting data to the transport stream processor 25. The API 81 also transfers, to the channel selection task 72, data transmitted from the transport stream processor 25 via the memory 28.

Based on the status change notification from the API 81, a signal from the interruption handler 83 which represents the generation of an error, or a signal from the interruption handler 83 which represents detection of the stream type, the status update task 82 updates the status (operational condition) of the transport stream processor 25. The status update task 82 also outputs, based on a status-transmitting command from the API 81, the status of the transport stream processor 25 to the channel selection task 72. The status update task 82 further outputs the interruption settings to the interruption handler 83.

The interruption handler 83 receives an interruption signal based on completion of DMA transfer, the generation of an error, or detection of a transport stream from the transport stream processor 25. When the received interruption signal is based on completion of DMA transfer, the interruption handler 83 outputs the corresponding signal to the API 81. When the received signal is based on the generation of an error or detection of a transport stream, the interruption handler 83 outputs the corresponding signal to the status update task 82. When receiving the interruption signal from the transport stream processor 25, the interruption handler 83 outputs a semaphore signal to the channel selection task 72.

Based on the semaphore signal from the software driver 71 and the status from the transport stream processor 25, the channel selection task 72 calls and executes each type of process. The channel selection task 72 also analyzes the data transferred from the transport stream processor 25 via the memory 28 and the API 81.

With reference to the timing chart in FIG. 4, the operations of the transport stream processor 25, the software driver 71, and the channel selection task 72 are described below which are performed when, among two types of transport streams A and B (hereinafter abbreviated to "Stream A" and "Stream B") (e.g., an output from the RF demodulator 21a or an output from the RF demodulator 21b) transmitted from the switch 24, Stream A is detected and is output to the video monitor 6 and the speaker 7.

By switching on the main power (not shown) of the set-top box 1, the CPU 27 executes the software driver 71 and the channel selection task 72 to initiate processing.

In step S1, the channel selection task 72 calls and instructs the API 81 to load a microcode for detecting a transport stream into the instruction memory 41 in the transport stream processor 25.

In step S2, based on the instruction from the channel selection task 72, the API 81 loads the microcode into the instruction memory 41 in the transport stream processor 25.

In step S3, the instruction decoder 42 in the transport stream processor 25 reads the microcode transferred from the API 81. Based on the read microcode, detection of the type of a transport stream is initiated using the program counter 43 when it is required.

In step S4, when Stream A or B is detected, the instruction decoder 42 in the transport stream processor 25 outputs an interruption signal representing detection of Stream A to the interruption handler 83 in the software driver 71. When Stream A or B is not detected, the instruction decoder 42 outputs an interruption signal representing the generation of an error to the interruption handler 83. Since this embodiment describes only the case where Stream A is detected, the instruction decoder 42 outputs an interruption signal representing detection of Stream A to the interruption handler 83.

Based on the received interruption signal representing the detection of Stream A, the interruption handler 83 in the software driver 71 outputs a signal representing the detection of Stream A to the status update task 82. In step S5, based on the signal representing the detection of Stream A, the status update task 82 updates the status so that it indicates "completion of detection of Stream A". The interruption handler 83 also outputs a semaphore signal to the channel selection task 72. The detailed operation of the status update task 82 is described later with reference to the flowchart shown in FIG. 5.

In step S6, based on the semaphore signal from the interruption handler 83 in the software driver 71, the channel selection task 72 calls and instructs the API 81 to transmit the status.

In step S7, based on the instruction from the channel selection task 72, the API 81 in the software driver 71 sends a status-transmitting instruction to the status update task 82. The status update task 82 outputs the present status "completion of detection of Stream A" of the transport stream processor 25 to the channel selection task 72.

In step S8, when acquiring the status "completion of detection of Stream A" of the transport stream processor 25 from the software driver 71, the channel selection task 72 transfers the audiovisual microcode to the instruction memory 41 in the transport stream processor 25, and sends, to the API 81, an instruction to transfer settings for acquiring program specifications.

In step S9, based on the instruction from the channel selection task 72, the API 81 in the transport stream processor 25 loads the audiovisual microcode into the instruction memory 41, and transfers, to the register 51, data on the settings for acquiring program specifications. At this time, the API 81 outputs a status-changing notification to the status update task 82. The status update task 82 updates the status of the transport stream processor 25 so that it indicates "Stream A in process".

In step S10, based on the microcode stored in the instruction memory 41, the instruction decoder 42 in the transport stream processor 25 acquires program-specification information, and controls the switch 52 to be connected to the terminal 52a, thereby transferring the program-specification information from the DMA controller 54 to the memory 28. On completion of this transfer, the instruction decoder 42 outputs an interruption signal representing completion of DMA transfer to the interruption handler 83. When the acquisition of the program-specification information or the DMA transfer fails, the instruction decoder 42 outputs an interruption signal representing an error. Since this embodiment describes the case where the program-specification information can be acquired and the DMA transfer is completed, the instruction decoder 42 outputs an interruption signal representing completion of DMA transfer to the interruption handler 83 in the software driver 71.

In step S11, based on the input interruption signal representing the completion of DMA transfer, the interruption handler 83 in the software driver 71 outputs a signal representing completion of DMA transfer to the API 81 and a semaphore signal representing completion of DMA transfer to the channel selection task 72.

In step S12, based on the semaphore signal from the interruption handler 83, the channel selection task 72 calls and instructs the API 81 to transfer the program-specification information stored in the memory 28 to the channel selection task 72.

In step S13, the API 81 in the software driver 71 transfers the program-specification information stored in the memory 28 to the channel selection task 72.

In step S14, the channel selection task 72 implements a process for analyzing the program-specification information transferred from the API 81. The channel selection task 72 calls the API 81, and controls the transport stream processor 25 and the video decoder 29 to display, from the video monitor 6, data of a list of programs, which is included in Stream A, based on the result of the analysis. After that, the channel selection task 72 awaits an event.

In step S15, when an error occurs in the processing of displaying the list of programs due to some fault, the instruction decoder 42 outputs an interruption signal representing the error to the interruption handler 83.

In step S16, the interruption handler 83 outputs a signal representing the error to the status update task 82 and a semaphore signal representing the error to the channel selection task 72.

In step S17, since the channel selection task 72 awaits the event, it proceeds back to step S1 when the error-representing semaphore signal is input from the software driver 71, and the subsequent steps are repeatedly performed. When time-out of awaiting a channel selection signal occurs since the list of programs is continuously displayed and the remote controller 8 is not operated by the user, the channel selection task 72 proceeds back to step S8, and the subsequent steps are repeatedly performed.

When an event input by the channel selection task 72 is a channel selection signal input by operating the remote controller 8, the channel selection task 72 calls the API 81, and sends, to the register 51 in the transport stream processor 25, an instruction to transfer audiovisual setting data on the selected program.

In step S18, based on the instruction, the API 81 transfers the audiovisual setting data to the register 51 in the transport stream processor 25.

In step S19, based on the microcode read from the instruction memory 41, the instruction decoder 42 uses the audiovisual setting data stored in the register 51 to appropriately control the switches 45, 49, 50, and 52 so that a video/audio packetized elementally stream (PES), obtained by processing the data of the user-selected program, is output to the video decoder 29 and the audio decoder 30 via the FIFOs 55 and 56, whereby a picture based on the program is displayed on the video monitor 6 and sound is output from the speaker 7.

In step S4, when the transport stream processor 25 detects Stream B, the above-described processing is executed by replacing the processing for Stream A with processing for Stream B.

In step S4, when no transport stream can be detected, the instruction decoder 42 in the transport stream processor 25 outputs an error-representing interruption signal to the interruption handler 83. Based on the interruption signal, the interruption handler 83 outputs an error-representing signal to the status update task 82 and an error-representing semaphore signal to the channel selection task 72. Based on this semaphore signal, the status update task 82 updates the status of the transport stream processor 25 so that it indicates "detection of invalid stream". Based on the semaphore signal, the channel selection task 72 proceeds back to step S1, and the subsequent steps are repeatedly performed.

In step S10, when the instruction decoder 42 fails to acquire the program-specification information due to a problem relating to the received signal or to perform DMA transfer, the instruction decoder 42 in the transport stream processor 25 outputs an error-representing interruption signal to the interruption handler 83. Based on the interruption signal, the interruption handler 83 outputs an error-representing signal to the status update task 82 and an error-representing semaphore signal to the channel selection task 72. Based on the signal, the status update task 82 updates the status of the transport stream processor 25 so that it indicates "detection of invalid stream". Based on the semaphore signal, the channel selection task 72 proceeds back to step S1, and the subsequent steps are repeatedly performed.

Figure 5:
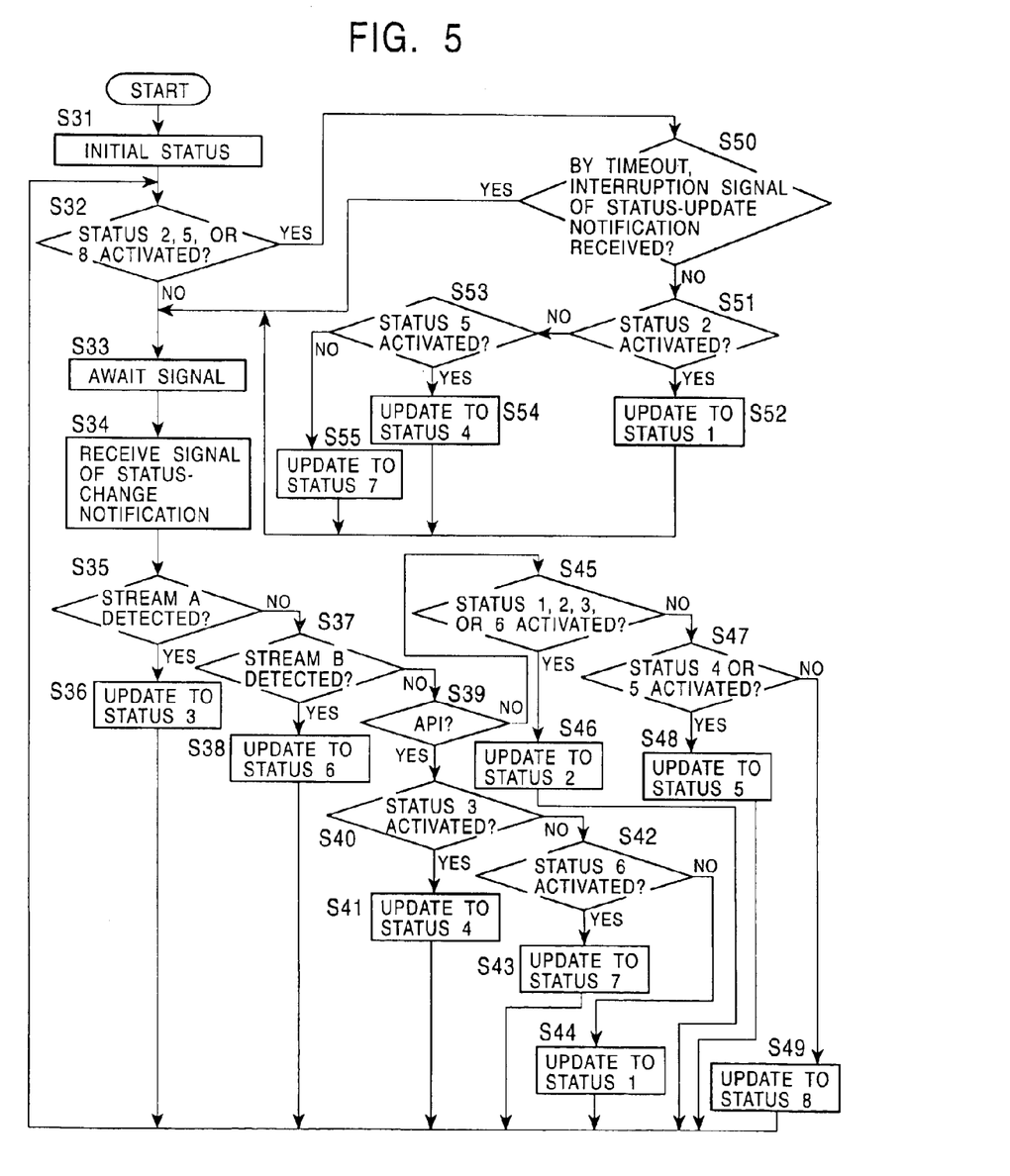
FIG. 5 is a flowchart illustrating the operation of the status update task 82 shown in FIG. 3.
Figure 6:
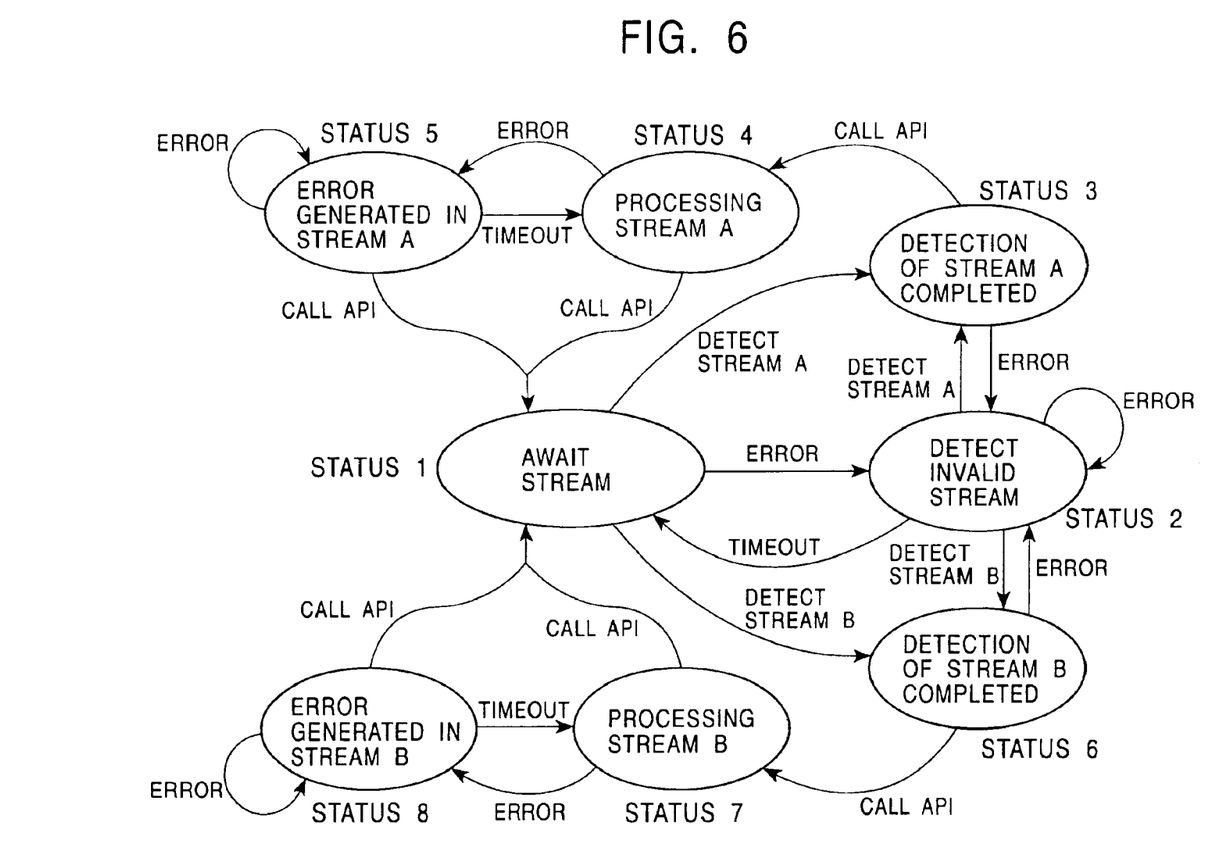
FIG. 6 is an illustration of transitions of the status of the transport stream processor 25 shown in FIG. 3.

With reference to the flowchart in FIG. 5 and the illustration in FIG. 6 showing transition of the statuses of the transport stream processor 25 which is managed by the status update task 82, the operation of the status update task 82 is described below which is performed when the status of the transport stream processor 25 is updated, such as "awaiting stream", "completion of detection of Stream A, and "Stream A in process" which correspond to the processing illustrated by the time chart in FIG. 4.

The status-transition chart in FIG. 6 shows the case where two types of transport streams, Stream A and Stream B, are used. FIG. 6 also shows that the transport stream processor 25 has eight transition statues: Status 1 "Await Stream"; Status 2 "Detect Invalid Stream"; Status 3 "Detection of Stream A Completed"; Status 4 "Processing Stream A"; Status 5 "Error Generated in Stream A"; Status 6 "Detection of Stream B Completed"; Status 7 "Processing Stream B"; and Status 8 "Error Generated in Stream B". In the following description, the status of the transport stream processor 25 is specifically described as Status 1, 2, 3, 4, 5, 6, 7, or 8.

By switching on the main power (not shown) of the set-top box 1, the software driver 71 in the CPU 27 is activated, whereby the status update task 82 initiates processing.

In step S31 (shown in FIG. 5), the status update task 82 sets the transport stream processor 25 to be in Status 1 as an initial status.

In step S32, the status update task 82 determines whether the present status of the transport stream processor 25 is Status 2, 5, or 8. In this embodiment, the present status is Status 1, the status update task 82 proceeds to step S33. The status of the transport stream processor 25, illustrated in steps S3 and S4 shown in FIG. 4 (time chart), corresponds to Status 1 shown in FIG. 6.

In step S33, the status update task 82 awaits a signal representing detection of a transport stream or an error from the interruption handler 83, or the status-change notification from the API 81.

Figure 4:
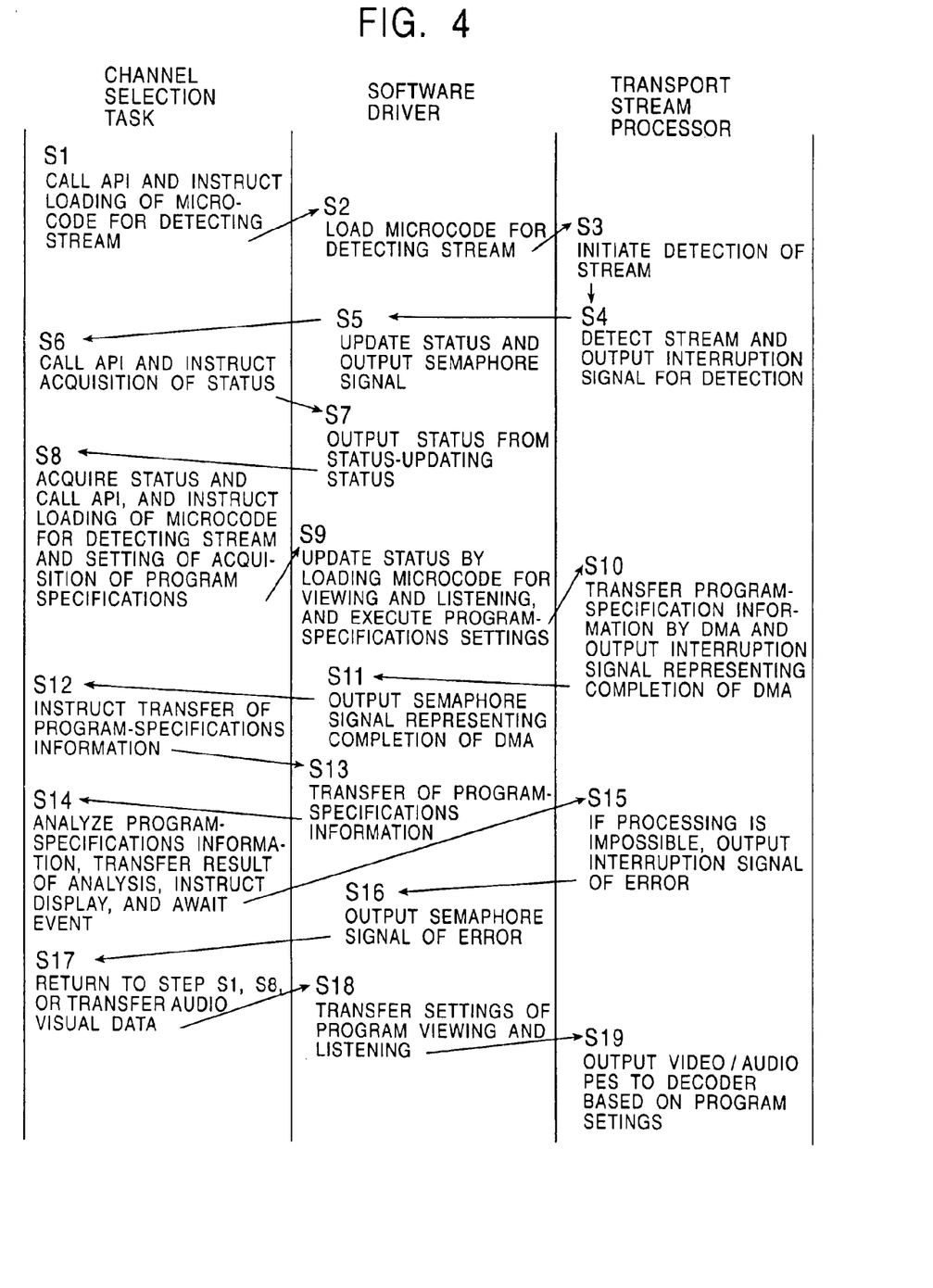
FIG. 4 is a time chart illustrating the operations of the channel selection task 72, the software driver 71, and the transport stream processor 25 shown in FIG. 3.

In step S34, the status update task 82 receives the signal representing detection of Stream A from the interruption handler 83, which corresponds to step S5 in FIG. 4.

In step S35, the status update task 82 determines whether the signal representing detection of Stream A is received. In this embodiment, the signal representing the detection of Stream A is received. Thus, the status update task 82 proceeds to step S36.

In step S36, the status update task 82 updates the status of the transport stream processor 25 from Status 1 to Status 3, and proceeds back to step S32. In other words, in step S5 in FIG. 4, and the subsequent steps, the transport stream processor 25 is in Status 3.

In step S32, the status update task 82 determines whether the present status of the transport stream processor 25 is Status 2, 5, or 8. Since the transport stream processor 25 is in Status 3 at this time, the status update task 82 determines that the present status is not Status 2, 5, or 8, and proceeds to step S33.

In step S33, the status update task 82 awaits the signal representing an error or detection of a transport stream, or the status-change notification from the API 81.

In step S34, the status update task 82 receives the status-change notification from the API 81, which corresponds to step S9 in FIG. 4.

In step S35, the status update task 82 determines whether the signal representing detection of Stream A is received. In this embodiment, what the status update task 82 receives is the status-change notification. Thus, the status update task 82 determines that the status-change notification is received. Thus, the status update task 82 determines that the received signal is not the signal representing detection of Stream A, and proceeds to step S37.

In step S37, the status update task 82 determines whether the status-change notification from the API 81 is received. In this embodiment, the status-change notification is received. Thus, the status update task 82 proceeds to step S40.

In step S39, the status update task 82 determines whether the status-change notification from the API 81 is received. In this embodiment, the status-change notification is received. Thus, the status update task 82 proceeds to step 540.

In step S40, the status update task 82 determines whether the present status of the transport stream processor 25 is Status 3. In this embodiment, the present status is Status 3. Thus, the status update task 82 determines that the transport stream processor 25 is in Status 3, and proceeds to step S41.

In step S41, the status update task 82 updates the present status of the transport stream processor 25 from Status 3 to Status 4. The status update task 82 proceeds back to step S32, and repeatedly performs the subsequent steps. In other words, in FIG. 4, the status of the transport stream processor 25 is in Status 4 in step S9 and the subsequent steps.

In step S37, when having received the signal representing detection of Stream B from the interruption handler 83, the status update task 82 proceeds to step S38, and updates the status of the transport stream processor 25 to Status 6.

In step S40, when the present status is not Status 3, the status update task 82 proceeds to step S42, and determines whether the present status is Status 6. In step S42, if the status update task 82 has determined that the present status is Status 6, it proceeds to step S43. In step S43, the status update task 82 updates the present status to Status 7, and proceeds back to step S32, where the subsequent steps are repeatedly performed.

In step S42, if the status update task 82 has determined that the present status is not Status 6, it proceeds to step S44, and updates the present status to Status 1. The status update task 82 proceeds back to step S32, and the subsequent steps are repeatedly performed.

In step S39, if the status update task 82 has determined that the status-change notification from the API 81 is not received, that is, the received signal is an error, it proceeds to step S45.

In step S45, the status update task 82 determines whether the present status is one of Statuses 1, 2, 3, and 6. At this time, if the status update task 82 has determined that the present status is one of Statuses 1, 2, 3, and 6, it proceeds to step S46. In step S46, the status update task 82 updates the present status to Status 2. The status update task 82 proceeds back to step S32, and repeatedly performs the subsequent steps.

In step S45, if the present status is not one of Statuses 1, 2, 3, and 6, the status update task 82 proceeds to step S47.

In step S47, the status update task 82 determines whether the present status is Status 4 or 5. At this time, if the status update task 82 has determined that the present status is Status 4 or 5, it proceeds to step S48, and updates the present status to Status 5. The status update task 82 proceeds back to step S32, and the subsequent steps are repeatedly performed.

In step S47, if the status update task 82 has determined that the present status is not Status 4 or 5, it proceeds to step S49, and updates the present status to Status 8. The status update task 82 proceeds back to step S32, and the subsequent steps are repeatedly performed.

In step S32, if the status update task 82 has determined that the present status is Status 2, 5, or 8, that is, a status provided with a time-out, it proceeds to step S50.

In step S50, the status update task 82 determines whether a signal caused by interruption or the status-change notification is received by the time-out.

In step S50, if the status update task 82 has determined that the signal caused by interruption or the status-change notification is received by the time-out, it proceeds to step S33, and the subsequent steps are repeatedly performed.

In step S50, if the status update task 82 has determined that the signal caused by interruption or the status-change notification is not received by the time-out, it proceeds to step S51.

In step S51, the status update task 82 determines whether the present status is Status 2. If the status update task 82 has determined that the present status is Status 2, it proceeds to step S52, and updates the present status to Status 1. The status update task 82 proceeds back to step S33, and the subsequent steps are repeatedly performed.

In step S51, if the status update task 82 has determined that the present status is not Status 2, it proceeds to step S53, and determines whether the present status is Status 5.

In step S53, if the status update task 82 has determined that the present status is Status 5, it proceeds to step S54, and updates the present status to Status 4. The status update task 82 proceeds to step S33, and the subsequent steps are repeatedly performed.

In step S53, if the status update task 82 has determined that the present status is not Status 5, it proceeds to step S55, and updates the present status to Status 7. The status update task 82 proceeds back to step S33, and the subsequent steps are repeatedly performed.

Although the case where the broadcast signal is received has been described, conversion into a different stream format and program extraction can be performed by providing the API 81 with a stream-changing microcode and a microcode for extracting a particular program. For example, by converting a transport stream broadcast with terrestrial waves, the converted stream may be output to the IEEE 1394 cables 5*a* and 5*b*.

As described above, information multiplexed by a plurality of methods can be separated at high speed.

Although the foregoing consecutive processes can be executed by hardware, they can be executed by software. In order that the consecutive processes may be executed by software, programs constituting the software are installed from a recording medium in a computer built in dedicated hardware or a multipurpose personal computer in which various functions can be executed by installing various programs in the personal computer.

Figure 7:
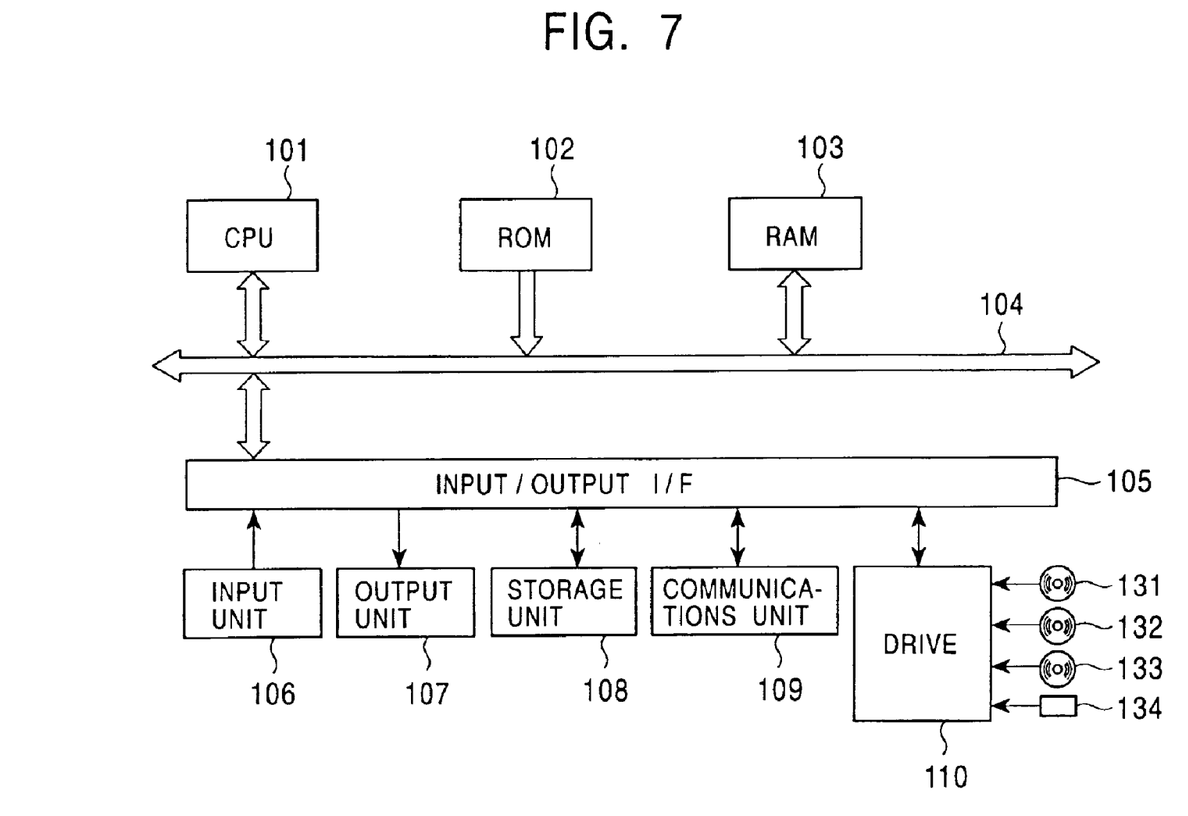
FIG. 7 is a block diagram showing a recording medium for use in the present invention.

FIG. 7 shows an example of a personal computer. A CPU 101 in the personal computer controls the entirety of the personal computer. When an instruction is input by the user to the CPU 101 from an input unit 106 including a keyboard and a mouse, the CPU 101 executes a program stored in a read-only memory (ROM) 102, which corresponds to the instruction. The CPU 101 loads in a random access memory (RAM) and executes a program that is read from one of drives 110 connected to a magnetic disk 131, an optical disk 132, a magneto-optical disk 133, and a semiconductor memory 134, and is installed in a storage unit 108. The CPU 101 controls the communications unit 109 to receive and transmit data by communicating with the exterior.

As shown in FIG. 7, a recording medium according to the present invention is provided in the form of package media distributed for providing programs to the user, which include the magnetic disk 131 (including a floppy disk), the optical disk 132 (including a compact disk read only memory (CD-ROM) and a digital versatile disk (DVD)), the magneto-optical disk 133 (including a Mini-Disk), and the semiconductor memory 134, which contain programs. In addition, the recording medium is provided in the form of the ROM 102 (containing programs) or a hard disk included in the storage unit 108, which are built into the computer.

In this Specification, steps that describes each program recorded on the recording medium include not only processes time-sequentially performed in described order but also processes performed in parallel or separately.

What is claimed is:

1. An information processing apparatus, comprising:
    a receiver to receive a first type of information from a plurality of different types of information as a transport stream;
    a first storage element to store a plurality of programs corresponding to a plurality of different methods capable of processing said plurality of different types of information;
    a second storage element;
    a program selector to select a method from said plurality of different methods for processing said first type of information, said program selector selecting different methods for different types of information using a semaphore signal that monitors the transport stream, said program selector configured to store said method in said second storage element; and
    a processor to process and control said first type of information by reading a program corresponding to said method stored in said second storage element.

2. An information processing apparatus according to claim 1, wherein said first storage element includes an updating element for updating said plurality of programs.

3. An information processing apparatus according to claim 1, where said processor converts the format of said first type of information into a different transport stream format.

4. An information processing apparatus according to claim 1, wherein said plurality of different types of information includes multiplexed signals composed of images, sounds, and data.

5. An information processing apparatus according to claim 4, wherein said processor operates to separate a multiplexed signal to output said first type of information received by said receiver.

6. An information processing apparatus according to claim 1, wherein said plurality of different types of information includes a satellite broadcast signal, a terrestrial broadcast signal, a community antenna television signal, and a signal input from an external unit.

7. An information processing selected method, comprising:
    receiving a first type of information from a plurality of different types of information as a transport stream;
    storing a plurality of programs corresponding to a plurality of different methods capable of processing said plurality of different types of information;
    selecting a method from said plurality of different methods for processing said first type of information, wherein a program selector selecting different methods for different types of information using a semaphore signal that monitors the transport stream; and
    processing said first type of information by reading a program corresponding to said method.

8. An information processing method according to claim 7, further comprising updating said plurality of programs.

9. An information processing method according to claim 8, wherein said processing includes converting the format of said first type of information into a different transport stream format.

10. An information processing method according to claim 8, wherein said plurality of different types of information includes multiplexed signal composed of images, sounds, and data.

11. An information processing method according to claim 10, wherein said processing includes separating a multiplexed signal to output said first type of information.

12. An information processing method according to claim 8, wherein said plurality of different types of information includes a satellite broadcast signal, a terrestrial broadcast signal, a community antenna television signal, and a signal input from an external unit.

13. A computer-readable reading medium containing a program for controlling an apparatus to execute the steps of:
    receiving a first type of information from a plurality of different types of information as a transport stream;
    storing a plurality of programs corresponding to a plurality of different methods capable of processing said plurality of different types of information;
    selecting a method from said plurality of different methods for processing said first type of information, wherein a program selector selecting different methods for different types of information using a semaphore signal that monitors the transport stream; and
    processing said first type of information by reading a program corresponding to said selected method.

14. A computer-readable recording medium according to claim 13, wherein said plurality of different types of information includes multiplexed signals composed of images, sounds, and data.

15. A computer-readable recording medium according to claim 14, wherein said processing includes separating a multiplexed signal to output said first type of information.

16. A computer-readable recording medium according to claim 13, wherein said plurality of different types of information includes a satellite broadcast signal, a terrestrial broadcast signal, a community antenna television signal, and a signal input from an external unit.

17. An information processing apparatus according to claim 1, wherein said second storage element includes an instruction memory for storing said program.

18. An information processing apparatus according to claim 17, further comprising:
    an instruction decoder for interpreting instructions of said program stored in said instruction memory.

* * * * *